US010427835B1

(12) United States Patent
Leslie-Shattenkirk

(10) Patent No.: US 10,427,835 B1
(45) Date of Patent: Oct. 1, 2019

(54) CONTAINER WITH INTERCHANGEABLE CRYSTAL DISPLAYS

(71) Applicant: Sharon Terry Leslie-Shattenkirk, Colorado Springs, CO (US)

(72) Inventor: Sharon Terry Leslie-Shattenkirk, Colorado Springs, CO (US)

( * ) Notice: Subject to any disclaimer, the term of this patent is extended or adjusted under 35 U.S.C. 154(b) by 87 days.

(21) Appl. No.: 15/666,788

(22) Filed: Aug. 2, 2017

(51) Int. Cl.
| | |
|---|---|
| *B65D 51/24* | (2006.01) |
| *G09F 19/00* | (2006.01) |
| *B65D 23/14* | (2006.01) |
| *B65D 1/02* | (2006.01) |
| *B65D 1/06* | (2006.01) |

(Continued)

(52) U.S. Cl.
CPC .......... *B65D 23/14* (2013.01); *B65D 1/0246* (2013.01); *B65D 1/0276* (2013.01); *B65D 1/06* (2013.01); *B65D 41/04* (2013.01); *B65D 51/242* (2013.01); *A47G 19/2205* (2013.01); *A47G 19/2227* (2013.01); *B65D 23/00* (2013.01); *B65D 23/12* (2013.01); *B65D 2203/00* (2013.01); *G09F 19/00* (2013.01)

(58) Field of Classification Search
CPC ................ A47G 19/2227; A47G 19/22; A47G 19/2205; B65D 51/24; B65D 51/242; B65D 23/14; B65D 1/0246; B65D 1/0276; B65D 1/06; B65D 41/04; B65D 23/00; B65D 23/12; B65D 2203/00; B65D 1/0223; G09F 19/00; B44C 5/005
USPC .......... 99/317, 279, 290, 323; 220/625, 662, 220/729, 504, 528, 592.17; 446/75, 74, 446/267; 206/457, 459.5, 217; 428/13, 428/14, 34.1; 215/6, 378; 426/132; 116/276, 227; D7/507, 509, 300, 514; D9/651
See application file for complete search history.

(56) References Cited

U.S. PATENT DOCUMENTS

| | | | | |
|---|---|---|---|---|
| 308,950 | A | * | 12/1884 | Chalvin .................. B65D 1/06 215/378 |
| 2,128,760 | A | * | 8/1938 | Shapiro .................... C12G 3/04 215/386 |

(Continued)

FOREIGN PATENT DOCUMENTS

DE  102014104664 A1 * 10/2015 ......... B65D 51/2807

OTHER PUBLICATIONS

Vitajuwel promotional website for Via Gemwater Bottle http://store.vitajuwel.us/via.aspx Accessed Jan. 5, 2019 (Year: 2019).*

(Continued)

*Primary Examiner* — J. Gregory Pickett
*Assistant Examiner* — Gideon R Weinerth
(74) *Attorney, Agent, or Firm* — Stephen M. Kepper; Intellectual Property Consulting, LLC

(57) ABSTRACT

A container with an interchangeable crystal display may include a container body sized to accommodate a volume of a liquid, the container body having an upper end and a lower end; a cap designed to removably engage with the upper end of the container body; a container base designed to removably engage with the lower end of the container body; and an interchangeable crystal display removably secured to a surface of the container base such that the interchangeable crystal display extends upwards from the container base into an interior of the container body when the container base is engaged with the lower end of the container body.

3 Claims, 4 Drawing Sheets

(51) Int. Cl.
  *B65D 41/04* (2006.01)
  *B65D 23/00* (2006.01)
  *B65D 23/12* (2006.01)
  *A47G 19/22* (2006.01)

(56) References Cited

U.S. PATENT DOCUMENTS

| | | | | |
|---|---|---|---|---|
| 2,187,558 A * | 1/1940 | Kushima | ............ | A47G 19/2288 215/12.1 |
| 2,487,594 A * | 11/1949 | Rudnick | ................ | C12G 3/065 426/124 |
| 2,876,692 A * | 3/1959 | Gaisman | ................. | B65D 1/06 215/261 |
| 5,484,630 A * | 1/1996 | McCall | ................... | G09F 19/00 428/11 |
| 5,769,680 A * | 6/1998 | Hoffman | ............ | A47G 19/2227 206/217 |
| 5,881,868 A * | 3/1999 | Soyak | ..................... | A24F 15/00 206/213.1 |
| 6,061,937 A * | 5/2000 | Meng | ...................... | G09F 19/08 40/409 |
| 6,117,502 A * | 9/2000 | Liao | ....................... | A63H 33/22 40/406 |
| 6,268,027 B1 * | 7/2001 | Wu | ....................... | A63H 23/08 40/406 |
| 6,390,319 B1 * | 5/2002 | Yu | .......................... | B65D 81/24 215/6 |
| D469,664 S * | 2/2003 | Marks | ............................ | D7/608 |
| 6,786,137 B1 * | 9/2004 | Shen | ...................... | A47J 31/18 99/279 |
| 7,010,935 B2 * | 3/2006 | Citrynell | ............ | A47G 19/2255 62/457.3 |
| D551,904 S * | 10/2007 | Rousso | .......................... | D7/510 |
| 7,287,656 B2 * | 10/2007 | Guilford, III | ............ | A61J 9/00 215/11.1 |
| D560,097 S * | 1/2008 | Shen | .............................. | D7/300 |
| 8,857,083 B2 * | 10/2014 | Volftsun | .................. | G09F 23/00 40/310 |
| D731,244 S * | 6/2015 | Kohl | .............................. | D7/510 |
| D777,517 S * | 1/2017 | Anzalone | ...................... | D7/507 |
| D778,675 S * | 2/2017 | Shi | ................................ | D7/507 |
| D784,765 S * | 4/2017 | Yao | .............................. | D7/510 |
| 9,688,445 B2 * | 6/2017 | Ayres | ................ | B65D 77/0486 |
| D820,043 S * | 6/2018 | Leslie-Shattenkirk | ........ | D7/507 |
| 10,059,483 B2 * | 8/2018 | Cornell | .................... | B65D 1/04 |
| D829,053 S * | 9/2018 | Leslie-Shattenkirk | ........ | D7/507 |
| 2004/0198139 A1 * | 10/2004 | Atobe | .................... | A63H 13/02 446/74 |
| 2008/0110882 A1 * | 5/2008 | Jang | .................. | A47G 19/2205 220/62.12 |
| 2008/0251063 A1 * | 10/2008 | Palena | ................ | A47J 36/2416 126/263.09 |
| 2010/0182771 A1 * | 7/2010 | Chang | .................. | B65D 51/248 362/155 |
| 2011/0253729 A1 * | 10/2011 | Ring | .................... | B65D 1/0223 220/681 |
| 2016/0176723 A1 * | 6/2016 | Schneider | ................. | A23L 2/00 99/290 |
| 2018/0186562 A1 * | 7/2018 | Nisbet | .................. | B65D 1/0223 |
| 2018/0362221 A1 * | 12/2018 | Hooks | ................... | B65D 41/04 |

OTHER PUBLICATIONS

EPO Machine Translation for DE 10 2014 104 664 A1 (German to English) (Year: 2019).*

* cited by examiner

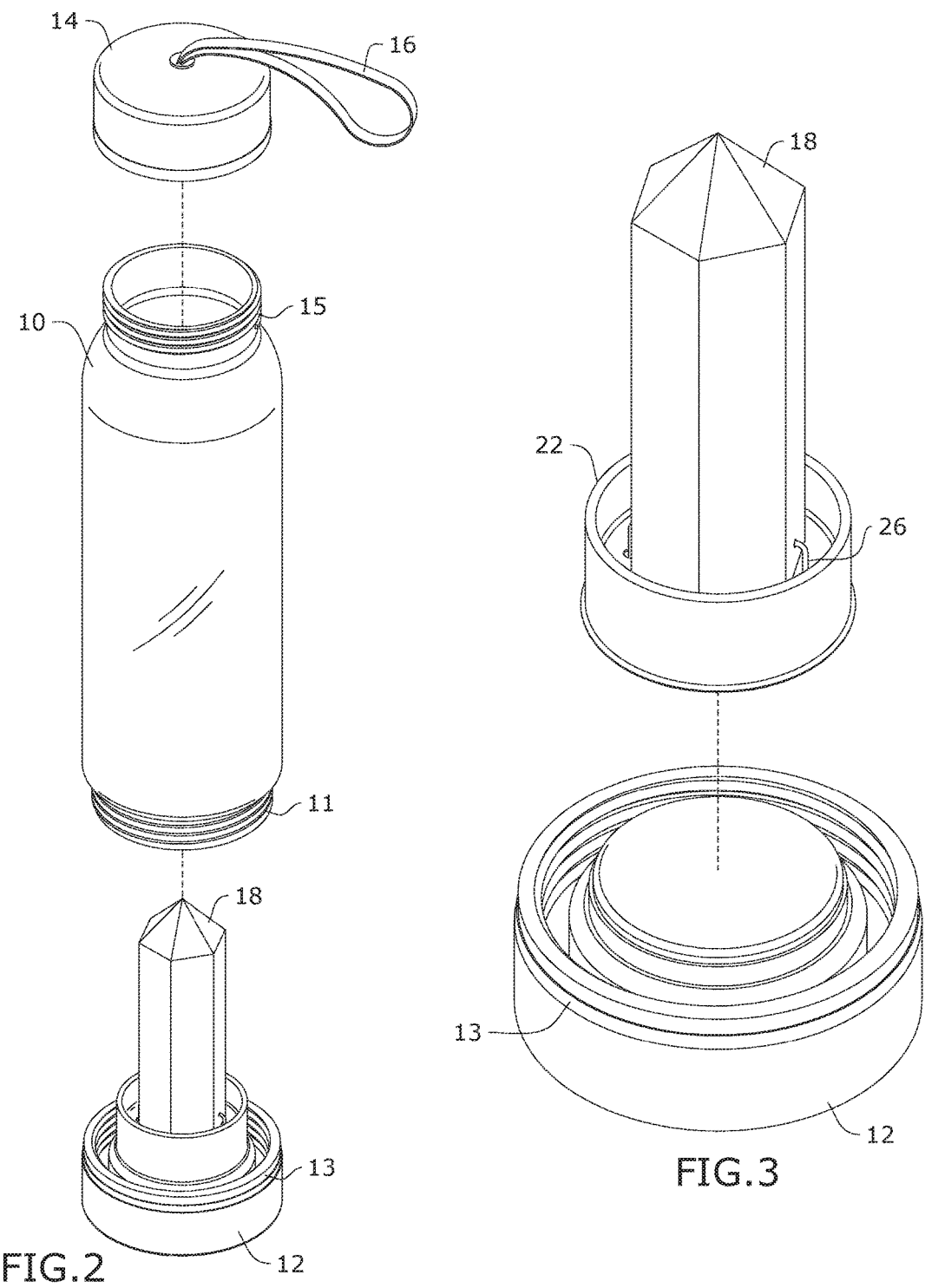

CONTAINER WITH INTERCHANGEABLE CRYSTAL DISPLAYS

BACKGROUND

The embodiments herein relate generally to containers, and more particularly, to a beverage container with an interchangeable crystal display.

Adding crystal elixirs to a drink, such as water, is believed to revitalize the water. Conventionally, adding crystals to water simply involves putting lose crystals into the liquid. This allows the crystals to move around, which can damage the crystals or the container, particularly if made out of glass.

An existing device includes a bottle with a glass globe positioned inside the liquid storage portion, wherein the crystals are held within the globe. However, in this product, because the crystals are held within the globe, they do not directly contact the water.

Therefore, what is needed is a beverage container with a crystal, wherein the crystal is secured in place and interchangeable, the crystal positioned in such a way so as to directly contact the beverage.

SUMMARY

Some embodiments of the present disclosure include a container with an interchangeable crystal display. The container may include a container body sized to accommodate a volume of a liquid, the container body having an upper end and a lower end; a cap designed to removably engage with the upper end of the container body; a container base designed to removably engage with the lower end of the container body; and an interchangeable crystal display removably secured to a surface of the container base such that the interchangeable crystal display extends upwards from the container base into an interior of the container body when the container base is engaged with the lower end of the container body.

BRIEF DESCRIPTION OF THE FIGURES

The detailed description of some embodiments of the invention is made below with reference to the accompanying figures, wherein like numerals represent corresponding parts of the figures.

FIG. 2 is an exploded view of one embodiment of the present disclosure.

FIG. 3 is a detail exploded view of one embodiment of the present disclosure.

DETAILED DESCRIPTION OF CERTAIN EMBODIMENTS

Figure 1:
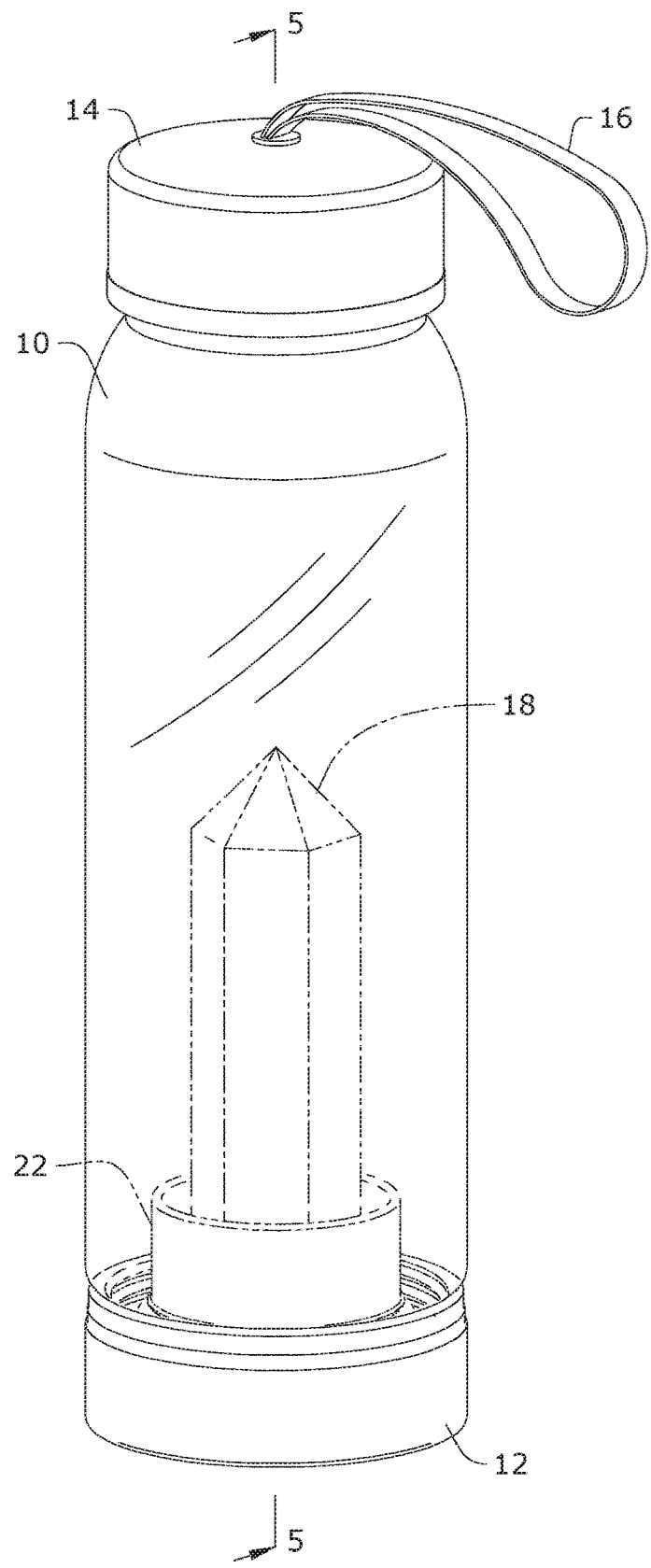
FIG. 1 is a perspective view of one embodiment of the present disclosure.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a beverage container with an interchangeable crystal display and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

a. Container Body
b. Container Base
c. Interchangeable Crystal
d. Crystal Base

The various elements of the device of the present disclosure may be related in the following exemplary fashion. It is not intended to limit the scope or nature of the relationships between the various elements and the following examples are presented as illustrative examples only.

By way of example, and referring to FIGS. 1-5, some embodiments of the present disclosure include a container, such as a beverage container, with an interchangeable crystal display, the container comprising a container body 10 sized to accommodate a volume of a liquid 30, such as water, the container body 10 having an upper end and a lower end; a cap 14 designed to removably engage with the upper end of the container body 10; a container base 12 designed to removably engage with the lower end of the container body 10; and an interchangeable crystal display removably secured to a surface of the container base 12 such that the interchangeable crystal display extends upwards from the container base 12 into an interior of the container body 10.

In some embodiments, the upper end of the container body 10 may comprise an upper threaded end 15, and the lower end of the container body 10 may comprise a lower threaded end 11. Moreover, the cap 14 may comprises a cap threads 17 designed to engage with the upper threaded end 15. Thus, the cap 14 may be a screw-cap and may removably secure to the container body 10 by screwing onto the container body 10. Similarly, the container base 12 may comprise base threads 13 designed to engage with the lower threaded end 11. Thus, the container base 12 may be a screw-on base. While the Figures show the cap 14 and container base 12 as being threaded, other conventional structures for removably securing the cap 14 and container base 12 may be alternatively used. For example, both the cap 14 and the container base 12 may snap onto the container body 10.

Figure 4:
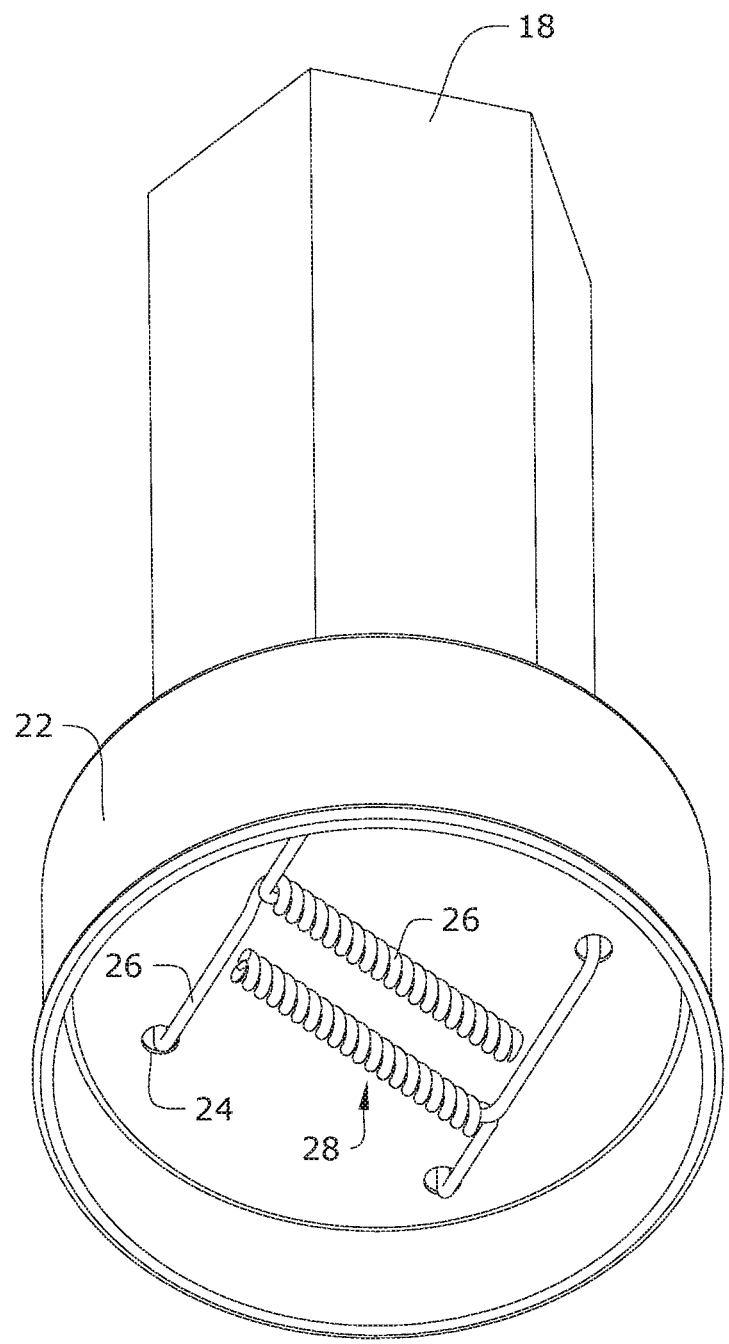
FIG. 4 is a bottom perspective view of one embodiment of the present disclosure.
Figure 5:
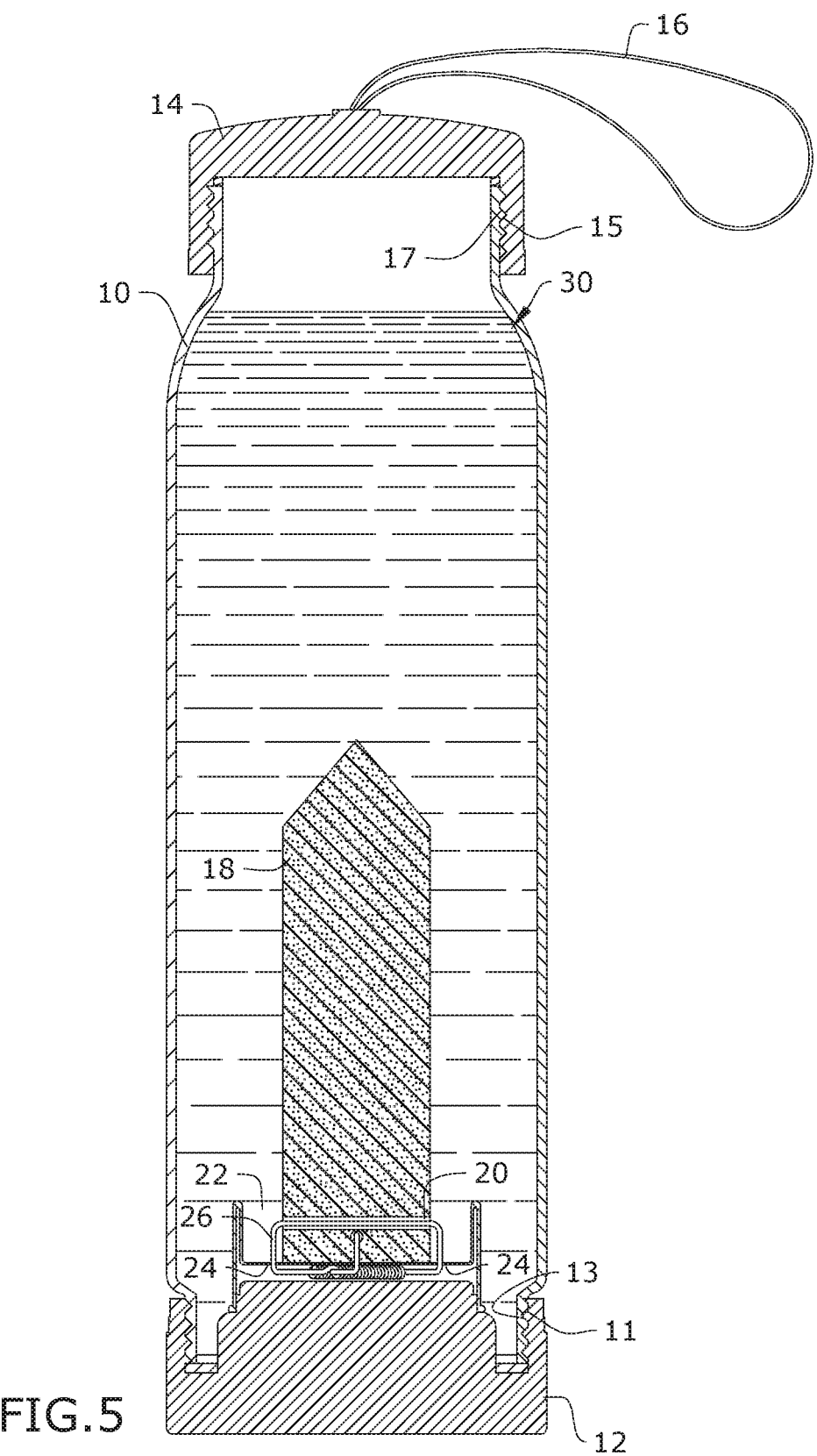
FIG. 5 is a section detail view of one embodiment of the present disclosure, taken along line 5-5 in FIG. 1.

The crystal display may comprise a crystal 18 removably secured to a crystal base 22, wherein the crystal base 22 is designed to engage with other otherwise attach to the container base 12. As shown in the Figures, the crystal 18 may be a singular elongate crystal. At least one channel 20 may extend through a portion of the crystal 18 proximate to the crystal base 22, wherein the channel 20 may have a diameter sufficient to accommodate a wire 26 being threaded therethrough. In some embodiments, the crystal 18 may include a plurality of channels 20, such as at least two channels 20. As shown in FIG. 4, the crystal base 22 may include at least one pair of wire orifices 24 extending therethrough, wherein the wire orifices 24 have a diameter sufficient to allow a wire 26 to pass therethrough. Thus, the wire 26 may be placed into the channel 20 such that one end of the wire 26 extends from one side of the crystal 18 and the other end of the wire 26 extends from another side of the crystal 18. The ends of the wire 26 may be threaded through the wire orifices 26 in the crystal base 22 and secured along a bottom side of the crystal base 22. For example, as shown in FIG. 4, the two ends of the wire 26 may be secured with a twist 28, the twist 28 being created simply by twisting the two ends of the wire 26 together. However, other knowns methods for securing the ends of the wire 26 are also envisioned. As a result, the crystal 18 is removably secured to the crystal base 22. Because of the structure of the crystal display, the crystal 18 may be interchangeable with other types of crystals 18 depending on the needs and desires of the user. Moreover, other decorative elements may be substituted for the crystal 18. As such, some embodiments of the present disclosure may comprise a beverage container with a decorative element removably and interchangeably secured within the container body 10.

In embodiments, the crystal base 22 may include a raised central area, and the container base 12 may similarly include a raised central area. As a result, the crystal base 22 may engage with, snugly slide onto, or otherwise snap onto the container base 12, securing the crystal display to the container base 12. Once the crystal display is secured to the container base 12, the container base 12 may be removably attached to the container body 10. A liquid 30, such as water, may then be poured into the container body 10, causing the liquid 30 to be in contact with the crystal 18. Because the crystal 18 is secured to the crystal base 22, which is in turn secured to the container base 12, the crystal 18 may be securely positioned within the container body 10. As a result, the crystal 18 may not freely float or move around the container body 10, preventing damage to the crystal 18 and the container body 10.

The beverage container of the present disclosure may be made of any desirable or suitable materials. For example, the container body 10 may comprise glass, while the cap 14, the container base 12, and the crystal base 22 may comprise a plastic or metal material. In some embodiments, and as shown in the Figures, the cap 14 may include a handle strap 16 extending therefrom. Any suitable crystals 18 or decorative elements may be secured to the crystal base 22. For example, the crystal 18 may comprise a quartz crystal, which are safe for direct method crystal elixir. Because the crystal 18 or other decorative element may be removed and interchanged, the crystal 18 or other decorative element may be easily washed and cared for.

While the container of the present disclosure is described as being a beverage container, this removably crystal display may be incorporated into any desired container, such as a perfume container, a vase, a spirits bottle, and the like.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A container with an interchangeable crystal display, the container comprising:
    a container body sized to accommodate a volume of a liquid, the container body having an upper end and a lower end;
    a cap designed to removably engage with the upper end of the container body;
    a container base designed to removably engage with the lower end of the container body; and
    an interchangeable crystal display removably secured to a surface of the container base such that the interchangeable crystal display extends upwards from the container base into an interior of the container body when the container base is engaged with the lower end of the container body,
    wherein the interchangeable crystal display further comprises a crystal removably secured to a crystal base, wherein the crystal base is designed to secure to the container base,
    wherein at least one channel extends through a portion of the crystal proximate to the crystal base; and the channel has a diameter sufficient to accommodate a wire being threaded therethrough.

2. The container of claim 1, wherein:
    the crystal base includes at least one pair of wire orifices extending therethrough; and
    the wire orifices have a diameter sufficient to allow a wire to pass therethrough.

3. The container of claim 2, wherein:
    a wire extends through the at least one channel;
    a first end of the wire extends through a first of the pair of wire orifices;
    a second end of the wire extends through a second of the pair of wire orifices; and
    the first end and the second end secure together along a bottom side of the crystal base.

* * * * *